(12) United States Patent
Oka

(10) Patent No.: US 10,171,781 B2
(45) Date of Patent: Jan. 1, 2019

(54) PROJECTION APPARATUS, METHOD FOR CONTROLLING THE SAME, AND PROJECTION SYSTEM

(71) Applicant: CANON KABUSHIKI KAISHA, Tokyo (JP)

(72) Inventor: Nobuhiro Oka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/345,348

(22) Filed: Nov. 7, 2016

(65) Prior Publication Data

US 2017/0142383 A1 May 18, 2017

(30) Foreign Application Priority Data

Nov. 13, 2015 (JP) ................. 2015-223340

(51) Int. Cl.
  *H04N 9/31* (2006.01)
  *H04N 5/353* (2011.01)
  *H04N 5/355* (2011.01)

(52) U.S. Cl.
  CPC ......... *H04N 9/3185* (2013.01); *H04N 5/3532* (2013.01); *H04N 5/35545* (2013.01); *H04N 5/35572* (2013.01); *H04N 9/3182* (2013.01); *H04N 9/3194* (2013.01)

(58) Field of Classification Search
  CPC .. H04N 9/3185; H04N 9/3182; H04N 9/3194; H04N 5/3532; H04N 5/35545; H04N 5/35572
  See application file for complete search history.

(56) References Cited

U.S. PATENT DOCUMENTS

| 8,907,795 | B2 | 12/2014 | Soto et al. | |
|---|---|---|---|---|
| 8,944,607 | B2* | 2/2015 | Ichieda | H04N 9/3185 |
| | | | | 353/69 |
| 9,170,161 | B2* | 10/2015 | Shibata | G01J 5/20 |
| 9,363,450 | B2* | 6/2016 | Nakamura | H04N 5/3559 |
| 9,413,982 | B2* | 8/2016 | Tan | H04N 5/232 |
| 2007/0061575 | A1* | 3/2007 | Bennett | H04L 63/0428 |
| | | | | 713/171 |

(Continued)

FOREIGN PATENT DOCUMENTS

| JP | 3908255 B2 | 4/2007 |
|---|---|---|
| JP | 2011-211693 A | 10/2011 |

*Primary Examiner* — Brian P Yenke
(74) *Attorney, Agent, or Firm* — Canon U.S.A., Inc. IP Division

(57) ABSTRACT

An image signal in which a predetermined calibration pattern is synthesized in an input image is output. Based on the output image signal, transmittance or reflectance of a liquid crystal panel is controlled, and an image is formed. The image is projected by irradiating the liquid crystal panel with light, and the projected image is captured. A calibration pattern is extracted from the captured image. A correction parameter is generated depending on a condition of the extracted calibration pattern. Image capturing timing is controlled so that an image before or after update of transmittance or reflectance of the liquid crystal panel is not mixed in the image captured by an image capturing sensor based on timing at which the transmittance or the reflectance of the liquid crystal panel is updated by a liquid crystal control unit.

10 Claims, 12 Drawing Sheets

(56) References Cited

U.S. PATENT DOCUMENTS

| | | | |
|---|---|---|---|
| 2007/0091201 A1* | 4/2007 | Sasaki | G03B 21/26 348/362 |
| 2007/0229673 A1* | 10/2007 | Araya | H04N 5/23232 348/220.1 |
| 2008/0049132 A1* | 2/2008 | Suzuki | H04N 5/23293 348/308 |
| 2009/0021621 A1* | 1/2009 | Hashimoto | H04N 5/3456 348/300 |
| 2009/0051794 A1* | 2/2009 | Ando | G06T 5/009 348/274 |
| 2010/0201894 A1* | 8/2010 | Nakayama | G09G 3/3433 348/745 |
| 2011/0215323 A1* | 9/2011 | Kurokawa | H01L 27/14603 257/53 |
| 2011/0292080 A1* | 12/2011 | Oka | H04N 9/3179 345/634 |
| 2012/0050698 A1* | 3/2012 | Kotani | G03B 21/14 353/94 |
| 2012/0105813 A1* | 5/2012 | Todoroki | H04N 9/3194 353/69 |
| 2012/0274779 A1* | 11/2012 | Tanaka | H04N 5/3653 348/164 |
| 2013/0088475 A1* | 4/2013 | Inagaki | G09G 3/3688 345/211 |
| 2013/0141569 A1* | 6/2013 | Ikeda | G01B 11/25 348/135 |
| 2013/0181969 A1* | 7/2013 | Kishi | G09G 3/3233 345/212 |
| 2013/0182062 A1* | 7/2013 | Son | H04N 7/144 348/14.07 |
| 2014/0176601 A1* | 6/2014 | Hamasaki | H04N 5/44508 345/629 |
| 2014/0354803 A1* | 12/2014 | Chida | G01B 11/25 348/136 |
| 2015/0130976 A1* | 5/2015 | Kato | H04N 5/378 348/300 |
| 2015/0161952 A1* | 6/2015 | Iguchi | G09G 3/3406 345/691 |
| 2015/0194128 A1* | 7/2015 | Hicok | G09G 5/12 345/428 |
| 2016/0094821 A1* | 3/2016 | Mori | H04N 9/3185 348/745 |
| 2016/0173799 A1* | 6/2016 | Akabori | H04N 5/378 348/322 |
| 2017/0034492 A1* | 2/2017 | Sano | H04N 1/32352 |
| 2017/0163914 A1* | 6/2017 | Hara | H04N 5/3537 |

* cited by examiner

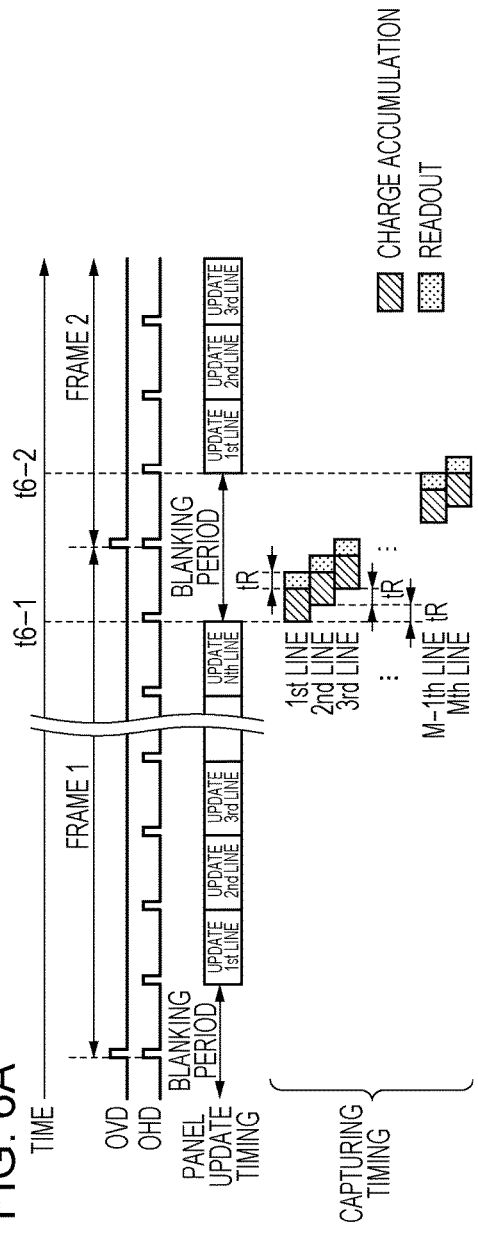
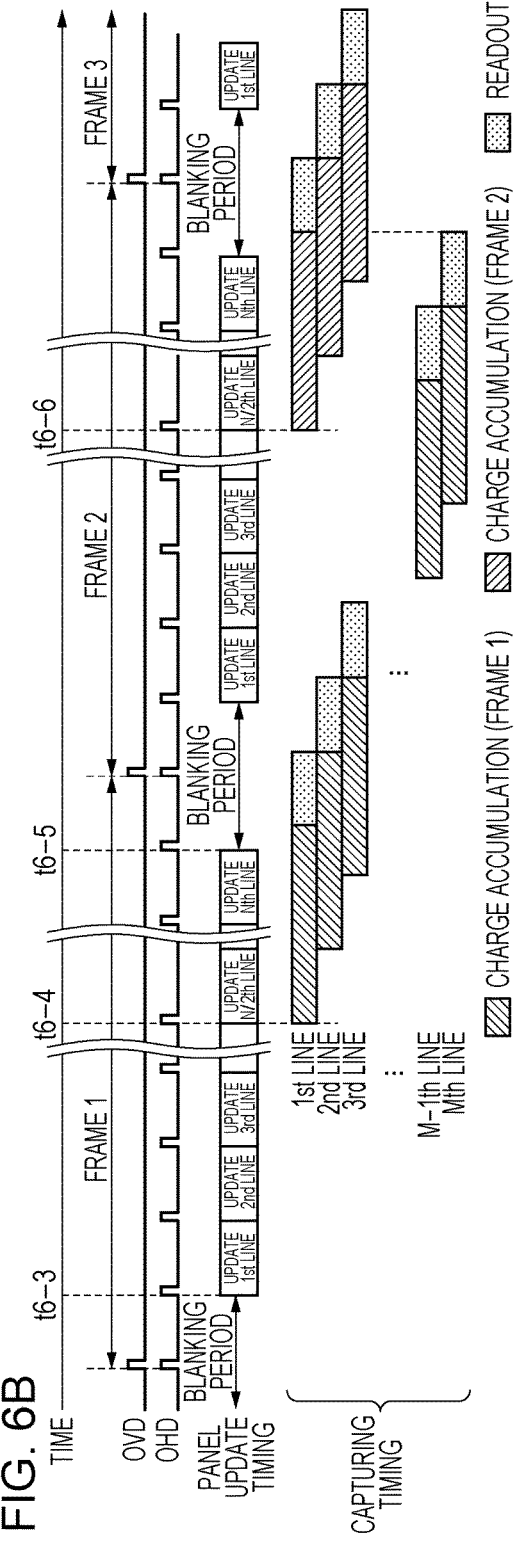

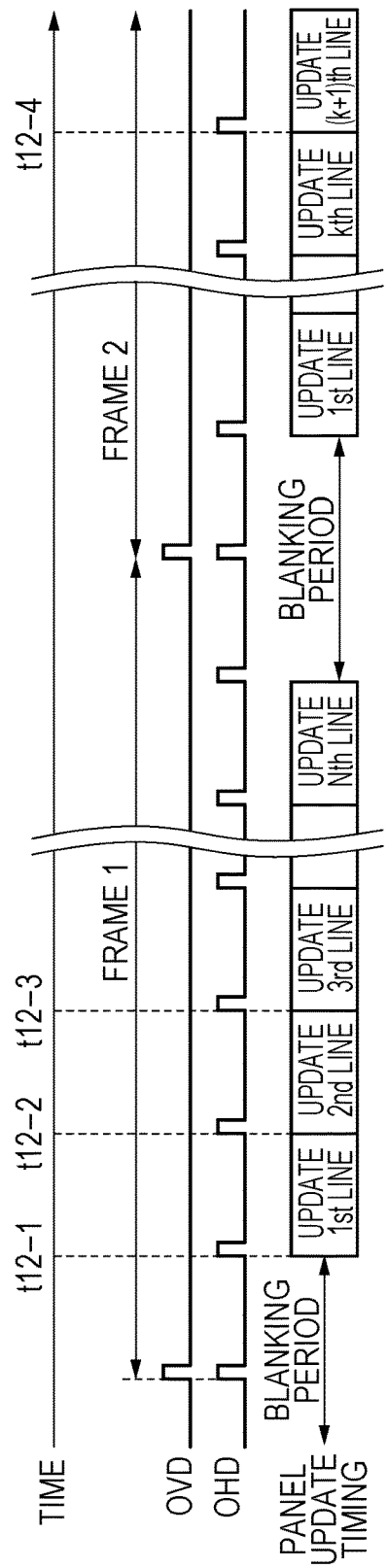
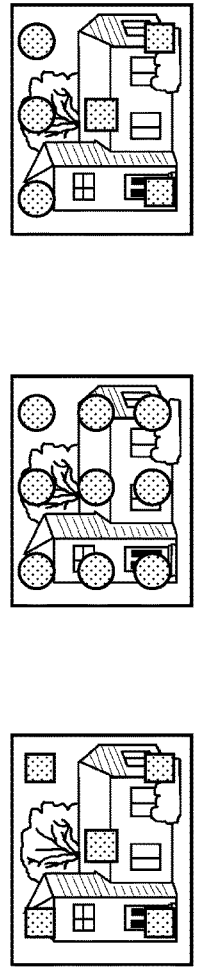
FIG. 12A PRIOR ART
FIG. 12B PRIOR ART
FIG. 12C PRIOR ART
FIG. 12D PRIOR ART

PROJECTION APPARATUS, METHOD FOR CONTROLLING THE SAME, AND PROJECTION SYSTEM

BACKGROUND OF THE INVENTION

Field of the Invention

The present disclosure generally relates to a projection apparatus, a method for controlling the same, and a projection system.

Description of the Related Art

In amusement facilities or in flight simulators, for example, simulation systems which employ projection apparatuses can be used all the time for the simulation use recently. One of problems with such projection systems used all the time is how to keep a projecting position, a shape, or image quality of the projected image.

There is a problem that, if the projecting position is shifted due to some factors, such as vibration of the projection apparatus, it may take much time and effort to interrupt the projection and calibrate manually. Especially in a system in which plural projection apparatuses are used in combination, calibration of mutual projecting positions is very difficult, which requires an expert with a special calibration technique.

To solve the above problems, Japanese Patent No. 3908255, for example, discloses a technique to capture a calibration pattern projected by a projection apparatus with a camera, generate an adjustment parameter, and correct a shape of the calibration pattern on a screen. Further, Japanese Patent Laid-Open No. 2011-211693, for example, discloses a technique to prevent a calibration pattern from disturbing the user's viewing the projected image by capturing the calibration pattern projected by non-visible light with a camera.

However, capturing timing of a projected image is not described in Japanese Patent No. 3908255 and Japanese Patent Laid-Open No. 2011-211693. Therefore, in a projection apparatus in which a projected image is updated line sequentially, for example, if the projected image with calibration patterns different for each frame being superimposed is to be captured, patterns of plural frames may exist in a single image depending on capturing timing. There is a problem that no appropriate adjustment parameter can be obtained from such an image.

This problem will be described with reference to FIGS. 12A to 12D. FIG. 12A illustrates exemplary update timing of an image drawn on a panel of a projection apparatus. FIG. 12B illustrates a projected image of a frame 1, and FIG. 12C illustrates a projected image of a subsequent frame 2.

The panel which displays the projected image updates the drawn image for each line in synchronization with a horizontal synchronizing signal (HD). An image of a 1st line of the frame 1 is drawn between time t121 to t122. An image of a 2nd line of the frame 1 is drawn between time t122 to t123. Similarly, all of the lines (here, N lines) of the panel are updated sequentially. The image of the line for which update is terminated is held until the next update.

FIG. 12D illustrates an image drawn on the panel at time t124. At time t124, a part up to a kth line which corresponds to ⅓ of the image of the frame 2 has been updated, and The image of the frame 1 is drawn continuously from a (k+1)th line to an Nth line. If the projected image is captured at this timing, an image as illustrated in FIG. 12D in which the frames 1 and 2 are mixed is captured. Using this image for the correction of the projected image can cause erroneous correction.

SUMMARY OF THE INVENTION

Aspects of the present disclosure address these issues.

In an aspect of the present disclosure, a projection apparatus includes: a synthesizing unit configured to output an image signal in which a predetermined calibration pattern is synthesized in an input image; a display control unit configured to control transmittance or reflectance of a display unit and form an image based on the image signal output from the synthesizing unit; a projecting unit configured to project an image formed on the display unit by irradiating the display unit with light; an image capturing unit configured to capture an image projected by the projecting unit; a generation unit configured to extract the calibration pattern from the image captured by the image capturing unit and generate a correction parameter for correcting an image to be formed on the display unit depending on a condition of the extracted calibration pattern; and an image capturing control unit configured to control image capturing timing so that an image before or after update of transmittance or reflectance of the display unit is not mixed in the image captured by the image capturing unit based on timing at which the transmittance or the reflectance of the display unit is updated.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIGS. 6A and 6B are timing diagrams illustrating exemplary timings of charge accumulation and readout of an image capturing sensor in the first embodiment.

FIG. 12A illustrates exemplary update timing of a related art panel of a linear sequential update system, and FIGS. 12B to 12D illustrate an image formed on the liquid crystal panel.

DESCRIPTION OF THE EMBODIMENTS

Various exemplary embodiments, features, and aspects of the disclosure will be described in detail below with reference to the drawings.

Although embodiments for implementing the present disclosure will be described in detail below with reference to the attached drawings, the present disclosure is not limited to the embodiments below. In the present embodiment, as an exemplary projection apparatus, a projector employing a liquid crystal panel will be described.

Entire Configuration

Figure 1:
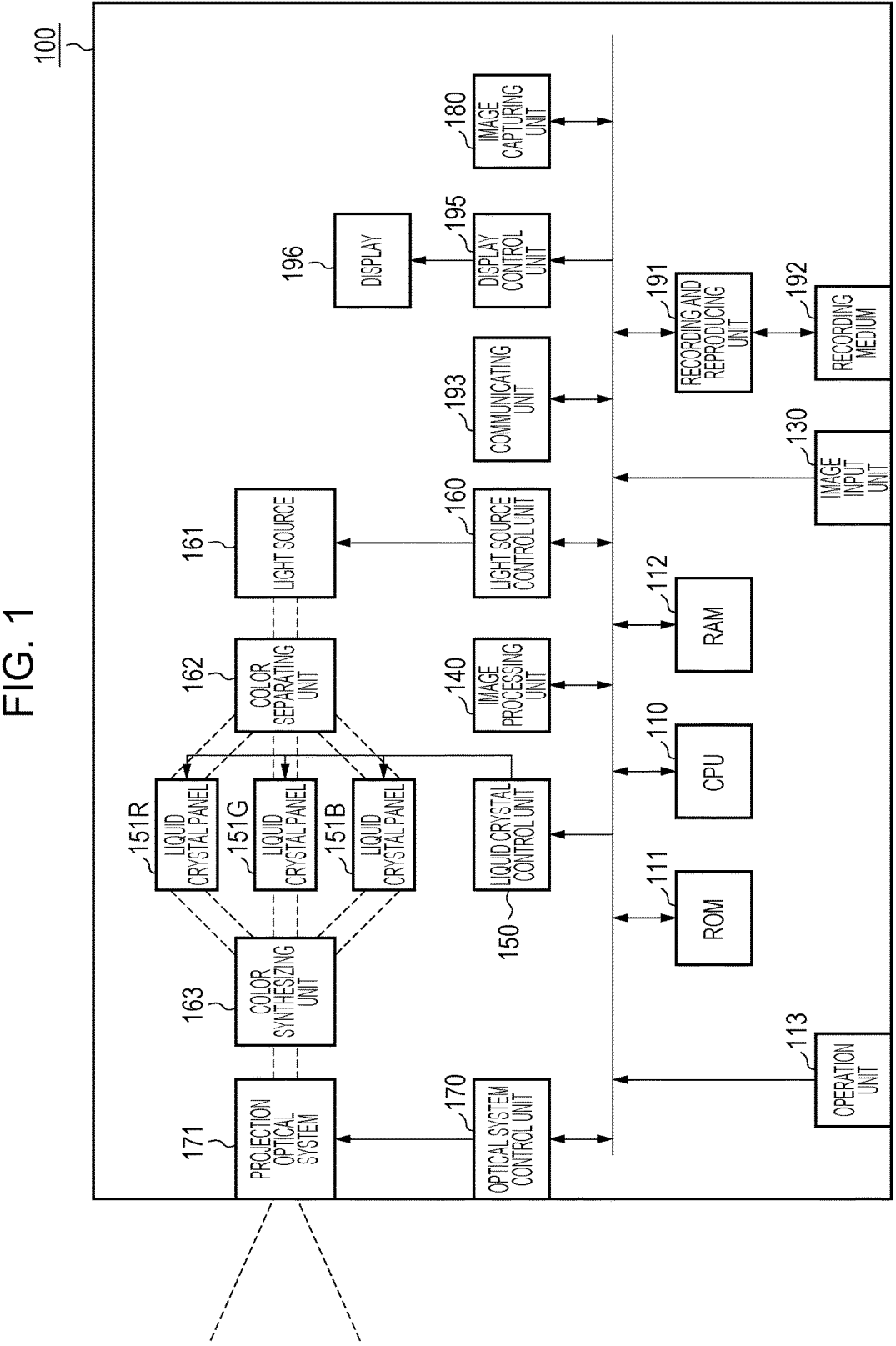
FIG. 1 is a block diagram illustrating an entire configuration of a liquid crystal projector in one embodiment.

First, an entire configuration of the liquid crystal projector will be described with reference to FIG. 1. A liquid crystal projector 100 of the present embodiment includes a central processing unit (CPU) 110, which may include one or more processors and one or more memories, read only memory (ROM) 111, random access memory (RAM) 112, an operation unit 113, an image input unit 130, and an image processing unit 140. The liquid crystal projector 100 further includes a liquid crystal control unit 150, liquid crystal panels 151R, 151G and 151B, a light source control unit 160, a light source 161, a color separating unit 162, a color synthesizing unit 163, an optical system control unit 170, and a projection optical system 171. The liquid crystal projector 100 may further include a recording and reproducing unit 191, a recording medium 192, a communicating unit 193, an image capturing unit 180, a display control unit 195, and a display unit 196. As used herein, the term "unit" generally refers to hardware, firmware, software or other component, such as circuitry, alone or in combination thereof, that is used to effectuate a purpose.

The CPU 110 controls each operating block of the liquid crystal projector 100. The ROM 111 stores a control program describing a procedure of the CPU 110, and the RAM 112 temporarily stores a control program and data as work memory. The CPU 110 may temporarily store still image data and video image data reproduced by the recording and reproducing unit 191 from the recording medium 192, and reproduce each image and video image using a program stored in the ROM 111. The CPU 110 may also temporarily store still image data and video image data received via the communicating unit 193 from an unillustrated external apparatus, and reproduce each image and video image using the program stored in the ROM 111. The CPU 110 may also temporarily store an image and a video image obtained by the image capturing unit 180 in the RAM 112, convert the stored images into still image data or video image data using the program stored in the ROM 111, and record the data in the recording medium 192.

The operation unit 113 receives an instruction of a user and transmits an instruction signal to the CPU 110. The operation unit 113 is constituted by a switch, a dial, and a touch panel provided on the display unit 196, for example. The operation unit 113 may be, for example, a signal receiving unit (e.g., an infrared receiving unit) which receives a signal from a remote control unit. The operation unit 113 may transmit a predetermined instruction signal to the CPU 110 based on a signal received. The CPU 110 receives a control signal input from an external apparatus via the operation unit 113 and the communicating unit 193, and controls each operating block of the liquid crystal projector 100. Any external apparatus may be employed which can communicate with the liquid crystal projector 100. For example, a personal computer, a camera, a mobile phone, a smartphone, a hard disk recorder, a gaming machine, and a remote control unit may be used.

The image processing unit 140 changes the frame number, the number of pixels, the image shape, etc., of a video signal received from an external apparatus via the image input unit 130, and transmits the video signal to the liquid crystal control unit 150. The image processing unit 140 is constituted by single or plural microprocessors for image processing, for example. The image processing unit 140 does not necessarily have to be a dedicated microprocessor. Alternatively, the CPU 110 may perform the same processing as that of the image processing unit 140 by the program stored in the ROM 111, for example. The image processing unit 140 may perform the following functions, such as frame thinning processing, frame interpolation processing, resolution conversion (scaling) processing, and distortion correction processing (keystone correction processing). Further, the image processing unit 140 may perform the change also to an image and a video image reproduced by the CPU 110 besides the video signal received from the image input unit 130.

The light source 161 emits light for projecting an image on an unillustrated screen, and may be a halogen lamp, a xenon lamp, and a high pressure mercury lamp, for example. The light source control unit 160 turns the light source 161 on and off and controls a light amount. The light source control unit 160 is constituted by single or plural microprocessors for control. The light source control unit 160 does not necessarily have to be a dedicated microprocessor. Alternatively, the CPU 110 may perform the same processing as that of the light source control unit 160 by the program stored in the ROM 111, for example. The color separating unit 162 separates light output from the light source 161 into red (R), green (G) and blue (B), and is constituted by a dichroic mirror, and a prism, for example. If a light emitting diode (LED) corresponding to each color, for example, is used as the light source 161, the color separating unit 162 is unnecessary.

The liquid crystal control unit 150 (a display control unit) controls a voltage applied to liquid crystal for each pixel of the liquid crystal panels 151R, 151G and 151B based on the video signal processed by the image processing unit 140, and adjusts transmittance or reflectance of the liquid crystal panels 151R, 151G and 151B. Because the projector will be described as a transmissive projector, the liquid crystal control unit 150 adjusts transmittance of the liquid crystal panels 151R, 151G and 151B below. If the projector is a reflective projector, the liquid crystal control unit 150 adjusts reflectance of the liquid crystal panels 151R, 151G and 151B. The liquid crystal control unit 150 is constituted by single or plural microprocessors for liquid crystal control, for example. The liquid crystal control unit 150 does not necessarily have to be a dedicated microprocessor. Alternatively, the CPU 110 may perform the same processing as that of the liquid crystal control unit 150 by the program stored in the ROM 111, for example.

The liquid crystal panel 151R is a liquid crystal panel corresponding to red and transmits, with transmittance adjusted under control of the liquid crystal control unit 150, light of red (R) among light output from the light source 161 and separated into red (R), green (G) and blue (B) by the color separating unit 162. The liquid crystal panel 151G is a liquid crystal panel corresponding to green and transmits, with transmittance adjusted under control of the liquid crystal control unit 150, light of green (G) among light separated by the color separating unit 162. The liquid crystal panel 151B is a liquid crystal panel corresponding to blue and transmits, with transmittance adjusted under control of the liquid crystal control unit 150, light of blue (B) among light separated by the color separating unit 162. In the following description, the liquid crystal panels 151R, 151G and 151B will be collectively referred to as a liquid crystal panel 151.

The color synthesizing unit 163 synthesizes light of red (R), green (G) and blue (B) which penetrated the liquid crystal panels 151R, 151G and 151B, respectively. The color synthesizing unit 163 is constituted by a dichroic mirror, and a prism, for example. The light in which components of red (R), green (G) and blue (B) are synthesized by the color synthesizing unit 163 is projected on a screen via the projection optical system 171. The liquid crystal panel 151 (a display unit) is controlled by the liquid crystal control unit 150 to have transmittance or reflectance of light corresponding to an image input from the image processing unit 140. Therefore, when light synthesized by the color synthesizing unit 163 is projected on the screen by the projection optical system 171, an image corresponding to the image input by the image processing unit 140 will be displayed on the screen.

The optical system control unit 170 controls the projection optical system 171, and is constituted by single or plural microprocessors for control. The optical system control unit 170 does not necessarily have to be a dedicated microprocessor. Alternatively, the CPU 110 may perform the same processing as that of the optical system control unit 170 by the program stored in the ROM 111, for example. The projection optical system 171 is used to project composite light output from the color synthesizing unit 163 on the screen. The projection optical system 171 is constituted by plural lenses and an actuator for driving the lenses. The actuator may perform enlargement, reduction, focus control, etc., of the projected image by driving the lenses.

The recording and reproducing unit 191 is used to reproduce still image data and video image data from the recording medium 192, receives still image data and video image data of the image or the video image obtained by the image capturing unit 180 from the CPU 110, and records the received data in the recording medium 192. The recording and reproducing unit 191 may record still image data and video image data received from the communicating unit 193 in the recording medium 192. The recording and reproducing unit 191 is constituted by an interface which is electrically connected with the recording medium 192, or single or plural microprocessors for communicating with the recording medium 192, for example. The recording and reproducing unit 191 does not necessarily have to include a dedicated microprocessor. Alternatively, the CPU 110 may perform the same processing as that of the recording and reproducing unit 191 by the program stored in the ROM 111, for example.

The recording medium 192 records still image data, video image data, other control data necessary for the liquid crystal projector 100 of the present embodiment, for example. The recording medium 192 may be any type of recording medium, such as a magnetic disk, an optical disk, and semiconductor memory, for example. The recording medium 192 may be removable or may be built-in.

The communicating unit 193 is used to receive a control signal, still image data, video image data, etc., from an external apparatus. The communicating method is not particularly limited and may be a wireless local area network (LAN), a wired LAN, a universal serial bus (USB), and the Bluetooth (registered trademark), for example. If a terminal of the image input unit 130 is a high definition multimedia interface (HDMI) (registered trademark) terminal, for example, a CEC communication may be performed via the terminal.

The image capturing unit 180 is used to obtain an image signal by capturing the image liquid crystal projector 100 of the present embodiment and a neighborhood thereof, and may capture an image projected via the projection optical system 171 (i.e., capture a direction of the screen). The image capturing unit 180 transmits the obtained image or video image to the CPU 110. The CPU 110 temporarily stores the image or video image in the RAM 112 and converts the stored data into still image data or video image data based on the program stored in the ROM 111. The image capturing unit 180 includes a lens for focusing an optical image of a subject, an actuator which drives the lens, and a microprocessor which controls the actuator. The image capturing unit 180 further includes an image sensor which converts an optical image entered via the lens into an image signal, and an AD conversion unit which converts the image signal obtained by the image sensor into a digital signal, for example. The image capturing unit 180 may be a device which may also capture a viewer located on the opposite side of the screen.

The display control unit 195 performs control to display an image of an operation screen, an image of a switch icon, etc., for operating the liquid crystal projector 100 on the display unit 196 provided in the liquid crystal projector 100. The display control unit 195 is constituted by single or plural microprocessors which perform display control, for example. The display control unit 195 does not necessarily have to be a dedicated microprocessor. Alternatively, the CPU 110 may perform the same processing as that of the display control unit 195 by the program stored in the ROM 111, for example. The display unit 196 displays an operation screen and a switch icon for operating the liquid crystal projector 100. The display unit 196 may be any type of display unit which can display an image, and may be a liquid crystal display, a cathode ray tube (CRT) display, an organic electroluminescent (EL) display, and a light emitting diode (LED) display, for example. Further, the display unit 196 may emit LED illumination to correspond to each of specific buttons, for example, in order to display the buttons to be recognizable by a user.

Basic Operation

Next, a basic operation of the liquid crystal projector 100 of the present embodiment will be described with reference to FIGS. 1 and 2.

Figure 2:
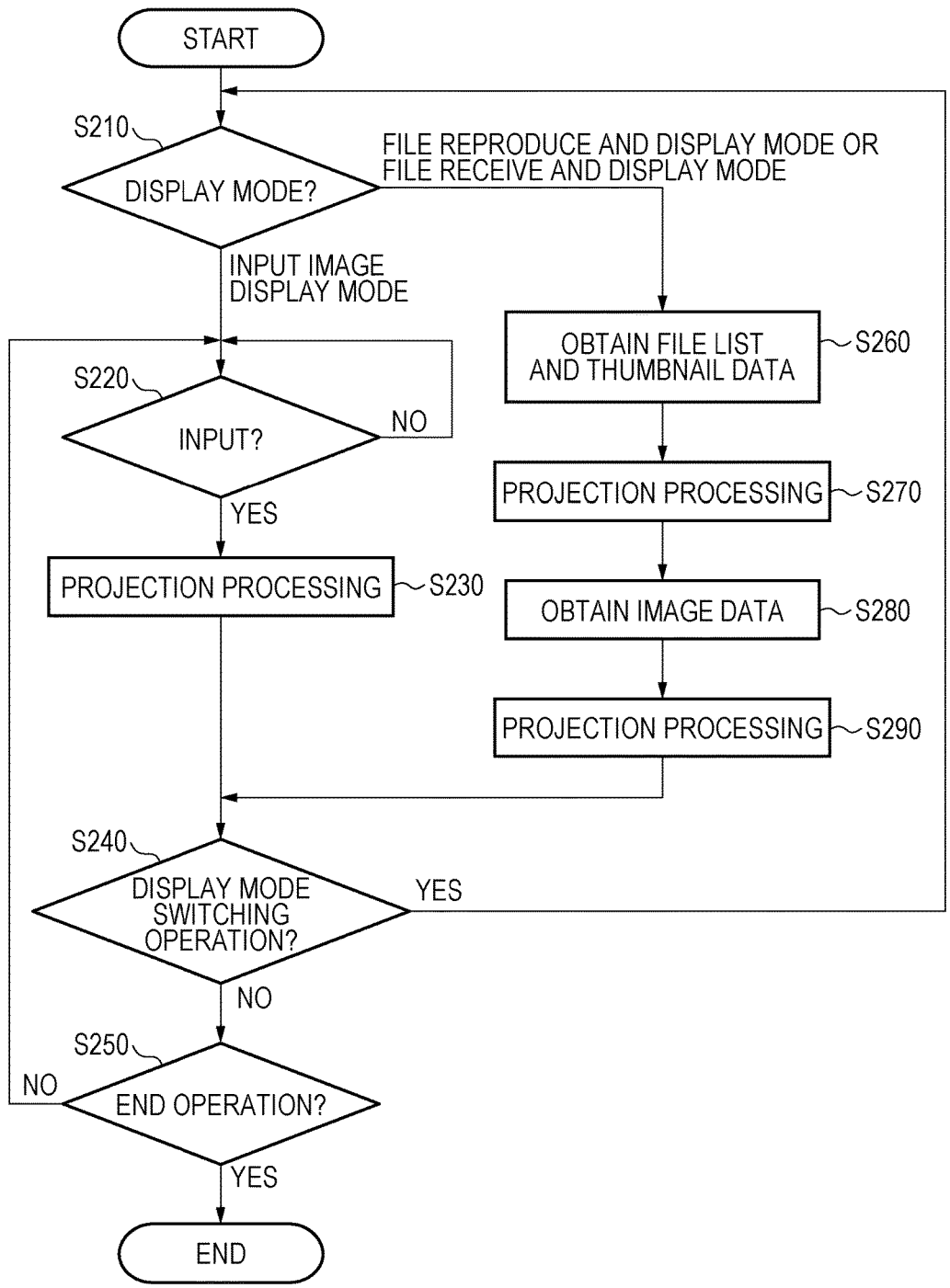
FIG. 2 is a flowchart for describing control of a basic operation of the liquid crystal projector in the embodiment.

FIG. 2 is a flowchart for describing control of the basic operation of the liquid crystal projector 100 of the present embodiment. The operation of FIG. 2 is executed basically when the CPU 110 controls each functional block based on a program stored in the ROM 111. The flowchart of FIG. 2 starts when the user instructs turning on of power of the liquid crystal projector 100 via the operation unit 113 or using an unillustrated remote control unit.

When the user instructs turning on of the power of the liquid crystal projector 100 via the operation unit 113 or using an unillustrated remote control unit, the CPU 110 supplies power to each part of the liquid crystal projector 100 from an unillustrated power supply unit.

Next, the CPU 110 determines a display mode selected by the user via the operation unit 113 or operating the remote control unit (S210). In the present embodiment, three display modes, namely, an "input image display mode," a "file reproduce and display mode" and a "file receive and display mode," are prepared as the display modes of the liquid crystal projector 100. In the "input image display mode," the image input from the image input unit 130 is displayed. In the "file reproduce and display mode," the image and the video image of the still image data and the video image data read from the recording medium 192 by the recording and reproducing unit 191 are displayed. In the "file receive and display mode," the image and the video image of the still image data and the video image data received from the communicating unit 193 are displayed. Although a case where the display mode is selected by the user will be described in the present embodiment, the display mode at the time when the power is turned on may be the same display mode as that at the time of the end of the previous operation or, alternatively, any of the above-described display modes may be set as a default display mode. In that case, processing of S210 may be omitted.

If the "input image display mode" is selected in S210, the CPU 110 determines whether a video image has been input from the image input unit 130 (S220). If no video image has been input (S220: No), the CPU 110 stands by until input is detected and, if a video image has been input (S220: Yes), the CPU 110 performs projection processing (S230).

As the projection processing, the CPU 110 transmits the video image input from the image input unit 130 to the image processing unit 140, makes the image processing unit 140 change the number of pixels of the video image, the frame rate, and the shape, and transmits an image for one screen which has been processed to the liquid crystal control unit 150. The CPU 110 makes the liquid crystal control unit 150 control transmittance of the liquid crystal panels 151R, 151G and 151B to have transmittance in accordance with a gradation level of each color component of red (R), green (G) and blue (B) of the received image for one screen. Then the CPU 110 makes the light source control unit 160 control output of light from the light source 161. The color separating unit 162 separates light output from the light source 161 into red (R), green (G) and blue (B), and supplies each light to the liquid crystal panels 151R, 151G and 151B. An amount of light of each color supplied to the liquid crystal panels 151R, 151G or 151B is limited depending on transmittance for each pixel of the liquid crystal panels 151. The light of red (R), green (G) and blue (B) penetrated the liquid crystal panels 151R, 151G and 151B, respectively, is supplied to the color synthesizing unit 163 and is synthesized again. The light synthesized in the color synthesizing unit 163 is projected on an unillustrated screen via the projection optical system 171. This projection processing is sequentially performed for each image of one frame during projection of the image.

When an instruction for operating the projection optical system 171 is input by the user via the operation unit 113, the CPU 110 controls the actuator of the projection optical system 171 so that the optical system control unit 170 changes a focal point of the projected image or changes an enlargement factor of the optical system.

During projection of the image described above, the CPU 110 determines whether an instruction for switching the display modes has been input by the user via the operation unit 113 (S240). If an instruction for switching the display modes has been input by the user via the operation unit 113 (S240: Yes), the routine returns to S210 again and the display mode is determined. The CPU 110 transmits, to the image processing unit 140, a menu screen for making the user select the display mode as an on-screen display (OSD) image, and controls the image processing unit 140 to superimpose the OSD image on the image being projected. The user may select the display mode while viewing the projected OSD image.

If no instruction for switching the display modes is input by the user via operation unit 113 during projection of the image (S240: No), the CPU 110 determines whether an instruction for terminating the projection has been input by the user via the operation unit 113 (S250). If an instruction for terminating the projection has been input by the user via the operation unit 113 (S250: Yes), the CPU 110 stops power supply to each block of the liquid crystal projector 100 and terminates the image projection. If no instruction for terminating the projection has been input by the user via the operation unit 113 (S250: No), the routine returns to S220, and processing from S220 to S250 is repeated until an instruction for terminating the projection is input by the user via the operation unit 113.

As described above, the liquid crystal projector 100 of the present embodiment projects an image on the screen.

If the "file reproduce and display mode" or the "file receive and display mode" is selected in S210, the routine proceeds to S260. In S260, if the "file reproduce and display mode" is selected, the CPU 110 makes the recording and reproducing unit 191 read a file list of still image data or video image data, and thumbnail data of each file from the recording medium 192 and temporarily stores the read file list and thumbnail data in the RAM 112. If the "file receive and display mode" is selected, the CPU 110 temporarily stores a file list and thumbnail data of each file of still image data or video image data received from the communicating unit 193 in the RAM 112. In S270, the CPU 110 generates a character image based on the file list temporarily stored in the RAM 112 or an image list based on the thumbnail data of each file based on the program stored in the ROM 111, and transmits the generated character image or image list to the image processing unit 140. The CPU 110 controls the image processing unit 140, the liquid crystal control unit 150, and the light source control unit 160 in the same manner as in the projection processing in S230 in the "input image display mode," and projects the image list.

Next, in S280, if an instruction for selecting a displayed character or image from the displayed image list is input via the operation unit 113, processing to obtain image data is performed. More specifically, in the "file reproduce and display mode," the CPU 110 controls the recording and reproducing unit 191 to read the selected still image data or video image data from the recording medium 192. In the "file receive and display mode," the CPU 110 issues a request to an external apparatus to transmit the selected still image data or video image data via the communicating unit 193. The CPU 110 temporarily stores the obtained still image data or video image data in the RAM 112. In S290, the CPU 110 projects the image or the video image of the still image data or the video image data in the same manner as in the projection processing in S230 in the "input image display mode" based on the program stored in the ROM 111.

When the video image data is reproduced, the video image of the reproduced video image data is transmitted sequentially to the image processing unit 140. Then the CPU 110 controls the image processing unit 140, the liquid crystal control unit 150, and the light source control unit 160 in the same manner as in the projection processing in S230 in the "input image display mode," and projects the video image. When the still image data is reproduced, the reproduced image is transmitted to the image processing unit 140. Then the CPU 110 controls the image processing unit 140, the liquid crystal control unit 150, and the light source control unit 160 in the same manner as in the projection processing in S230 in the "input image display mode," and projects the still image.

First Embodiment

Figure 3:
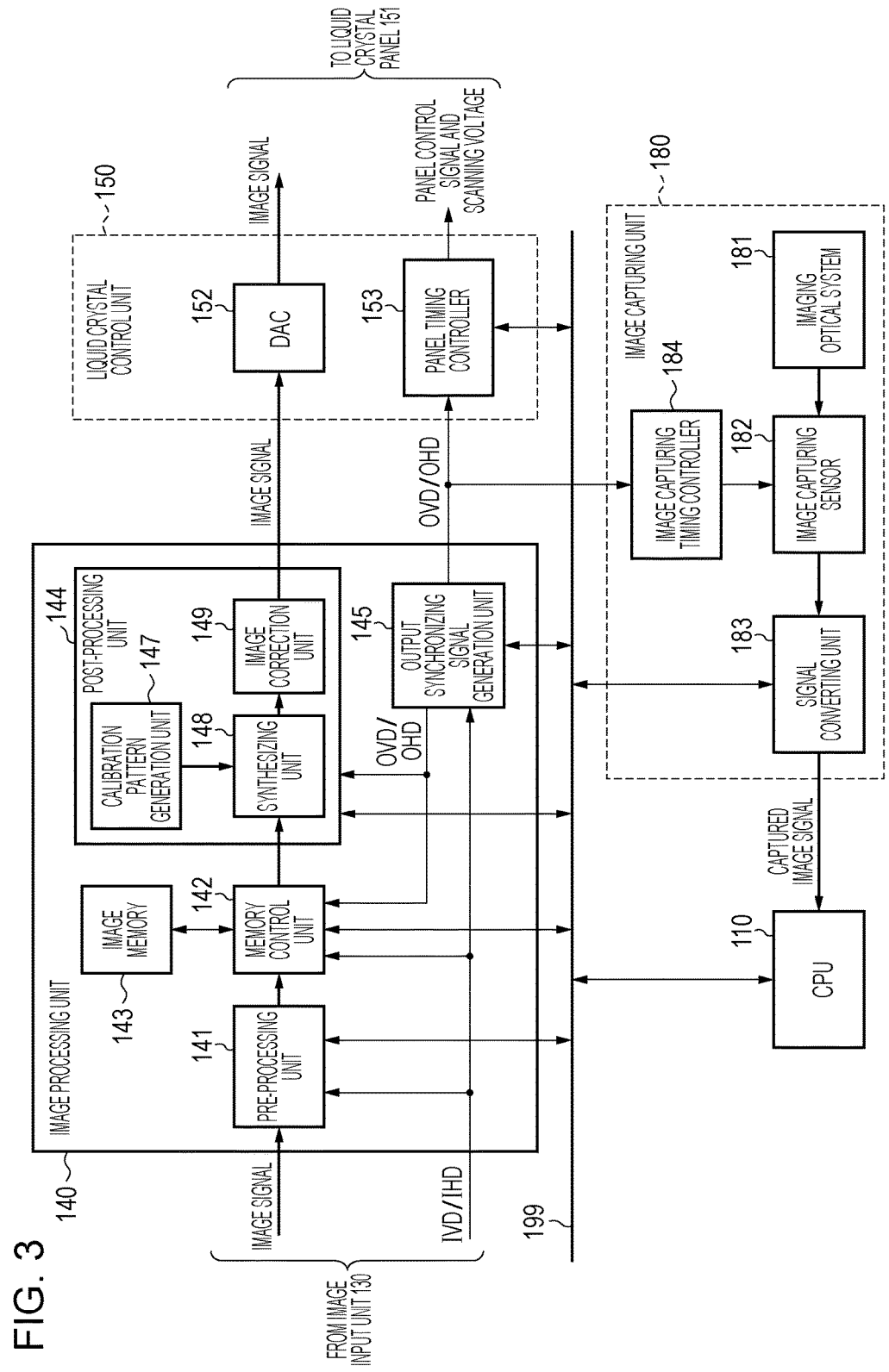
FIG. 3 is a block diagram illustrating internal configurations of an image processing unit, a liquid crystal control unit, and an image capturing unit in a first embodiment.

Next, configurations of the image processing unit 140, the liquid crystal control unit 150, and the image capturing unit 180 in the liquid crystal projector 100 of a first embodiment having the configurations described above will be described in detail with reference to FIG. 3.

Configuration of Image Processing Unit 140

The image processing unit 140 is constituted by a pre-processing unit 141, a memory control unit 142, an image memory 143, a post-processing unit 144, and an output synchronizing signal generation unit 145. The image processing unit 140 applies a calibration pattern to the image data to project.

The pre-processing unit 141, the memory control unit 142, the post-processing unit 144, and the output synchronizing signal generation unit 145 are connected with the CPU 110 via a register bus 199. Timing signals including an input vertical synchronizing signal IVD and an input horizontal synchronizing signal IHD from the image input unit 130 are input in the pre-processing unit 141 and the memory control unit 142. Timing signals including an output vertical synchronizing signal OVD and an output horizontal synchronizing signal OHD from the liquid crystal control unit 150 are input in the memory control unit 142 and the post-processing unit 144. In the following description, the input vertical synchronizing signal (IVD) and the input horizontal synchronizing signal (IHD) will be collectively referred to as input synchronizing signals, and the output vertical synchronizing signal (OVD) and the output horizontal synchronizing signal (OHD) will be collectively referred to as output synchronizing signals.

The pre-processing unit 141 converts color space and resolution of the image input from the image input unit 130 into those suitable for the liquid crystal panel 151. Specifically, the pre-processing unit 141 performs conversion processing of a display layout including color space conversion and enlarging or reducing processing.

The memory control unit 142 performs conversion processing on a time axis, such as IP conversion and frame rate conversion, issuance of a memory address of the image memory 143 used for the shape correction of the projected image, and control on writing and reading of the image. Further, the frame rate is doubled by reading the same image twice from the image memory 143. In either case, with respect to the image memory 143, writing control of the image is performed in synchronization with the IVD and the IHD, and reading control of the image is performed in synchronization with the OVD and the OHD.

Figure 4A:
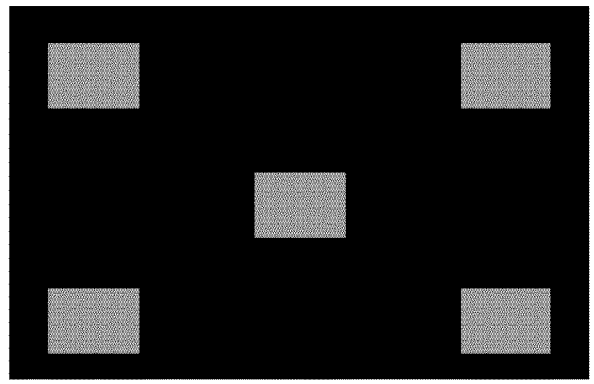
FIG. 4A illustrates an exemplary calibration pattern in the first embodiment.

The post-processing unit 144 includes a calibration pattern generation unit 147, a synthesizing unit 148, and an image correction unit 149. The calibration pattern generation unit 147 generates a pattern necessary for the calibration of the projecting position or the shape of the projected image. This pattern is not particularly limited and may be a publicly known pattern consisting of plural rectangles as illustrated in FIG. 4A, and a pattern in which two-dimensional coordinate information generated using the technique disclosed in U.S. Pat. No. 8,907,795 is coded, for example.

The synthesizing unit 148 synthesizes the calibration pattern generated by the calibration pattern generation unit 147 in the input image. During synthesis, the synthesizing unit 148 corrects gradation of the calibration pattern so that no overflow or underflow of the gradation occurs.

Figure 4B:
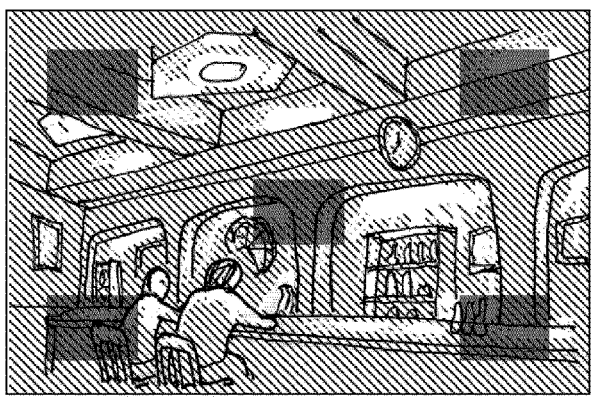
FIGS. 4B and 4C illustrate synthesis examples of the calibration pattern in a projected image.
Figure 4C:
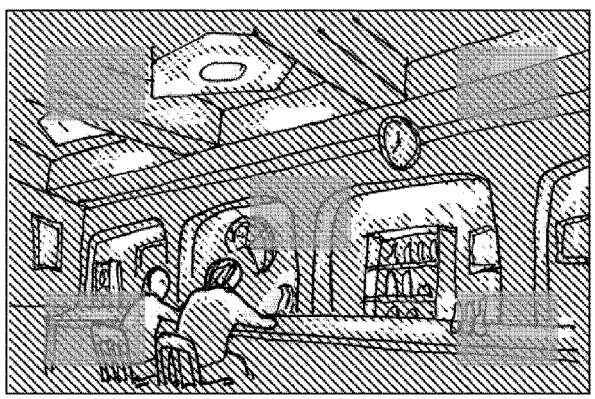

It is desirable that the calibration pattern synthesized in the projected image is not visible by the viewer of the liquid crystal projector 100. Then, the synthesizing unit 148 does not necessarily have to always synthesize a calibration pattern in an image, but only one frame may be synthesized as necessary in every several minutes. As described above, if the frame rate is doubled by the memory control unit 142 reading the same image twice from the image memory 143, the calibration pattern may be synthesized in the following manner. That is, in the previously read frame, the calibration pattern is synthesized by subtracting as illustrated in FIG. 4B, and in the frame read subsequently, the calibration pattern is synthesized by adding as illustrated in FIG. 4C. In this method, the pattern may be made less visible by using a visual integral effect using two frames.

The image correction unit 149 performs correction processing to correct display unevenness (color unevenness and luminance unevenness) and disclination caused by the liquid crystal panel 151 and the projection optical system 171. The image correction unit 149 further performs image processing, such as gradation conversion like dithering, and gamma conversion, in accordance with gradation characteristics of the liquid crystal panel 151.

The output synchronizing signal generation unit 145 generates an output synchronizing signal (OVD, OHD). The output synchronizing signal generation unit 145 generates the OVD and the OHD by counting a reference clock which is used as a base of an unillustrated dot clock input therein. The OVD and the OHD are treated as standard signals for synchronizing reading an image from the image memory 143 by the memory control unit 142 with the post-processing unit 144, and update timing of the liquid crystal panel 151 which is driven by the liquid crystal control unit 150.

Configuration of Liquid Crystal Control Unit 150

The liquid crystal control unit 150 is constituted by a digital-to-analog conversion unit (DAC) 152 and a panel timing controller 153. The DAC 152 converts a digital image signal processed by the image processing unit 140 into an analog signal and transmits the converted signal to the liquid crystal panel 151.

The panel timing controller 153 generates a control signal and a scanning voltage signal necessary for driving the liquid crystal panel 151 in synchronization with the output synchronizing signal received from the image processing unit 140. In accordance with an instruction for vertically inverting the projected image from the CPU 110, the panel timing controller 153 generates a control signal for instructing scanning order of drawing to the image signal with respect to the liquid crystal panel 151. When instructed to vertically invert the projected image by the CPU 110, the panel timing controller 153 transmits a control signal so that video image data is drawn from a lower line toward a higher line with respect to the liquid crystal panel 151. With this operation, the image formed on the liquid crystal panel 151 is inverted vertically.

Update Timing of Each Line of Liquid Crystal Panel 151

The liquid crystal panel 151 in the first embodiment is driven in a linear sequential active matrix driving system. Update timing of each pixel which constitutes the liquid crystal panel 151 will be described. The number of lines of the liquid crystal panel 151 will be described as N lines (N is an integer).

The panel timing controller 153 changes a predetermined line of the liquid crystal panel 151 into an updatable condition by applying a scanning voltage to that line in synchronization with the output horizontal synchronizing signal OHD. In this condition, when an analog signal output from the DAC 152 is sequentially applied to a pixel electrode of a line of the liquid crystal panel 151 to which the scanning voltage is being applied, a pixel of the line in the updatable condition is driven and the displayed image is updated. The once updated pixel is held until update timing of a subsequent frame. Since the line to which the scanning voltage is applied is changed over one frame period, update of the pixel is also performed for each line. The update timing of the liquid crystal panel 151 has been described schematically.

Next, update timing of the liquid crystal panel 151 will be described in detail with reference to FIGS. 5A, 5B, 6A and 6B.

Figure 5A:
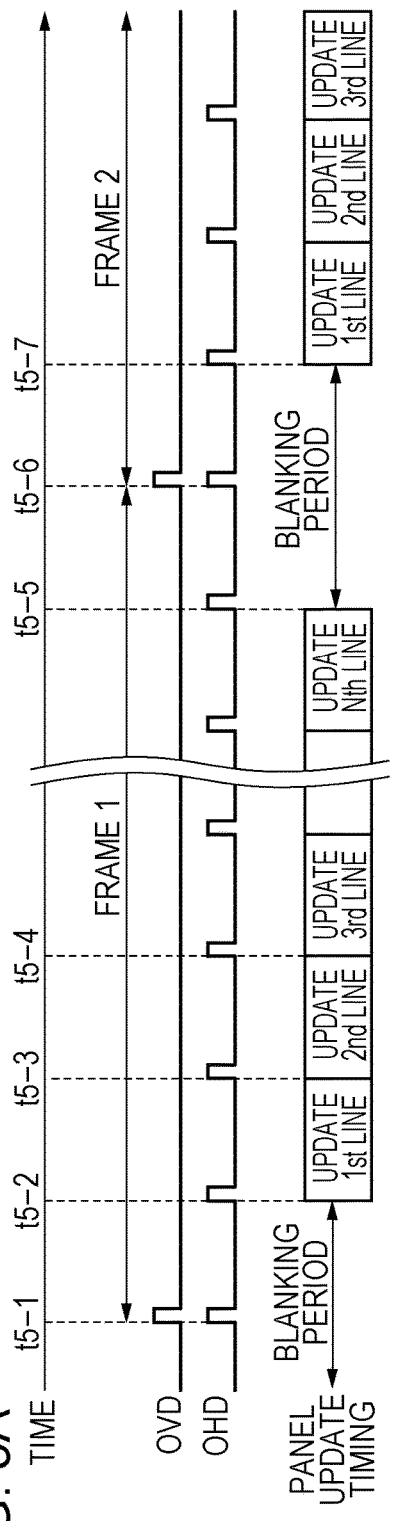
FIGS. 5A and 5B are timing diagrams illustrating update timings of the liquid crystal panel in the first embodiment.

FIG. 5A illustrates update timing of the liquid crystal panel 151 during ordinary projection in which an image is projected without being inverted vertically. First, the panel timing controller 153 which controls update timing of the liquid crystal panel 151 detects a rise of the OVD at t5-1, and recognizes the start of drawing processing of an image of a frame 1.

Next, the panel timing controller 153 counts the OHD a predetermined number of times (twice, in this example) and applies the scanning voltage to the 1st line which is the leading line of the liquid crystal panel 151 at a rise of the OHD of a predetermined number of times (t5-2). In this condition, update of each pixel of the 1st line is performed in accordance with the analog signal from the DAC 152 input in the pixel electrode of the liquid crystal panel 151. Next, at the next rise of the OHD (t5-3), the panel timing controller 153 terminates application of the scanning voltage to the 1st line of the liquid crystal panel 151, whereby update of the 1st line of the liquid crystal panel 151 is terminated. At t5-3, the panel timing controller 153 applies the scanning voltage to the 2nd line of the liquid crystal panel 151 to start update of the pixel of the 2nd line, and terminates application of the scanning voltage at the next rise (t5-4) of the OHD and terminates update.

The panel timing controller 153 updates the liquid crystal panel 151 from the 1st line to the Nth line in an ascending order in the above procedure, and an image of the frame 1 is drawn in all the pixels at t5-5.

Next, the panel timing controller 153 recognizes that drawing processing of an image of the frame 2 has been instructed by detecting the OVD at t5-6. From the second rise of the OHD in the frame 2 (t5-7), the panel timing controller 153 updates from the 1st line to the Nth line in an ascending order in the same manner as in the drawing processing of the frame 1.

The update timing of the liquid crystal panel 151 when the image is projected without being inverted vertically has been described.

Figure 5B:
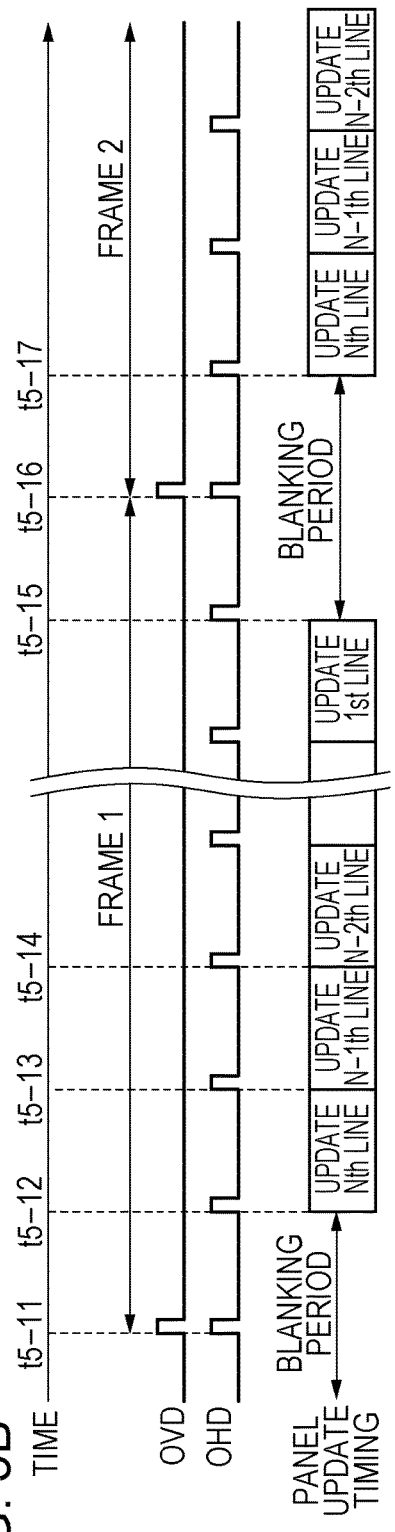

FIG. 5B illustrates update timing of the liquid crystal panel 151 when the image is projected in a vertically inverted manner. First, the panel timing controller 153 which controls the update timing of the liquid crystal panel 151 detects a rise of the OVD at t5-11, and recognizes the start of the drawing processing of the image of the frame 1.

Next, the panel timing controller 153 counts the OHD a predetermined number of times (twice, in this example) and applies the scanning voltage to the Nth line which is the last line of the liquid crystal panel 151 at a rise (t5-12) of the OHD of a predetermined number of times. In this condition, update of each pixel of the Nth line is performed in accordance with the analog signal from the DAC 152 input in the pixel electrode of the liquid crystal panel 151. Next, at the next rise of the OHD (t5-13), the panel timing controller 153 terminates application of the scanning voltage to the Nth line of the liquid crystal panel 151, whereby update of the Nth line of the liquid crystal panel 151 is terminated. At t5-13, the panel timing controller 153 applies the scanning voltage to a N−1th line of the liquid crystal panel 151 to start update of the pixel of the N−1th line, and terminates application of the scanning voltage at the next rise of the OHD (t5-14) and terminates update.

The panel timing controller 153 updates the liquid crystal panel 151 from the Nth line to the 1st line in a descending order in the above procedure, and an image of the frame 1 is drawn in all the pixels at t5-15.

Next, the panel timing controller 153 recognizes that drawing processing of an image of the frame 2 has been instructed by detecting the OVD at t5-16. From the second rise of the OHD in the frame 2 (t5-17), the panel timing controller 153 updates from the Nth line to the 1st line in the descending order in the same manner as in the drawing processing of the frame 1.

The update timing of the liquid crystal panel 151 when the image is projected in a vertically inverted manner has been described.

Although the update timing of the liquid crystal panel 151 has been described, the operations of the liquid crystal panel 151 and the panel timing controller 153 in the present disclosure are not limited to those described above. For example, the panel timing controller 153 may apply a scanning voltage in synchronization with a DE signal which is not illustrated representing a valid period of data. Plural pixels which form the line of the liquid crystal panel 151 may be updated simultaneously during a period for which the scanning voltage is applied or may be updated in time series. Either case may be employed as long as each line of the liquid crystal panel 151 is updated not simultaneously but sequentially.

Configuration of Image Capturing Unit 180

Next, returning to FIG. 3, a specific configuration of the image capturing unit 180 will be described. The image capturing unit 180 is constituted by an imaging optical system 181, an image capturing sensor 182, a signal converting unit 183, and an image capturing timing controller 184 (an image capturing control unit). Light entering through the imaging optical system 181 is photoelectrically converted into an image signal by the image capturing sensor 182. Then, the signal converting unit 183 performs amplification of the captured image, AD conversion, etc., with respect to the image signal and a digitized captured image signal is transmitted to the CPU 110. The image capturing timing controller 184 controls timings of charge accumulation and readout of the image capturing sensor 182. The image capturing timing controller 184 operates in synchronization with the OVD and the OHD output from the output synchronizing signal generation unit 145 of the image processing unit 140. That is, since the timings of charge accumulation and readout of the image capturing sensor 182 are also in synchronization with the OVD and the OHD, update timing of the liquid crystal panel 151 and the timings of charge accumulation and readout of the image capturing sensor 182 are also in synchronization with each other.

Capturing Timing of Image Capturing Unit 180

Next, timing at which the image capturing unit 180 in the first embodiment captures the projected image will be described with reference to FIGS. 6A, 6B and 7. The image capturing sensor 182 in the first embodiment employs a rolling shutter system in which charge reset and readout are performed sequentially for each line (each row). The number of lines of the image capturing sensor 182 is M lines (M is an integer) here.

FIGS. 6A and 6B illustrate capturing timing in a case where update timing of the liquid crystal panel 151 is the timing illustrated in FIG. 5A.

Figure 7:
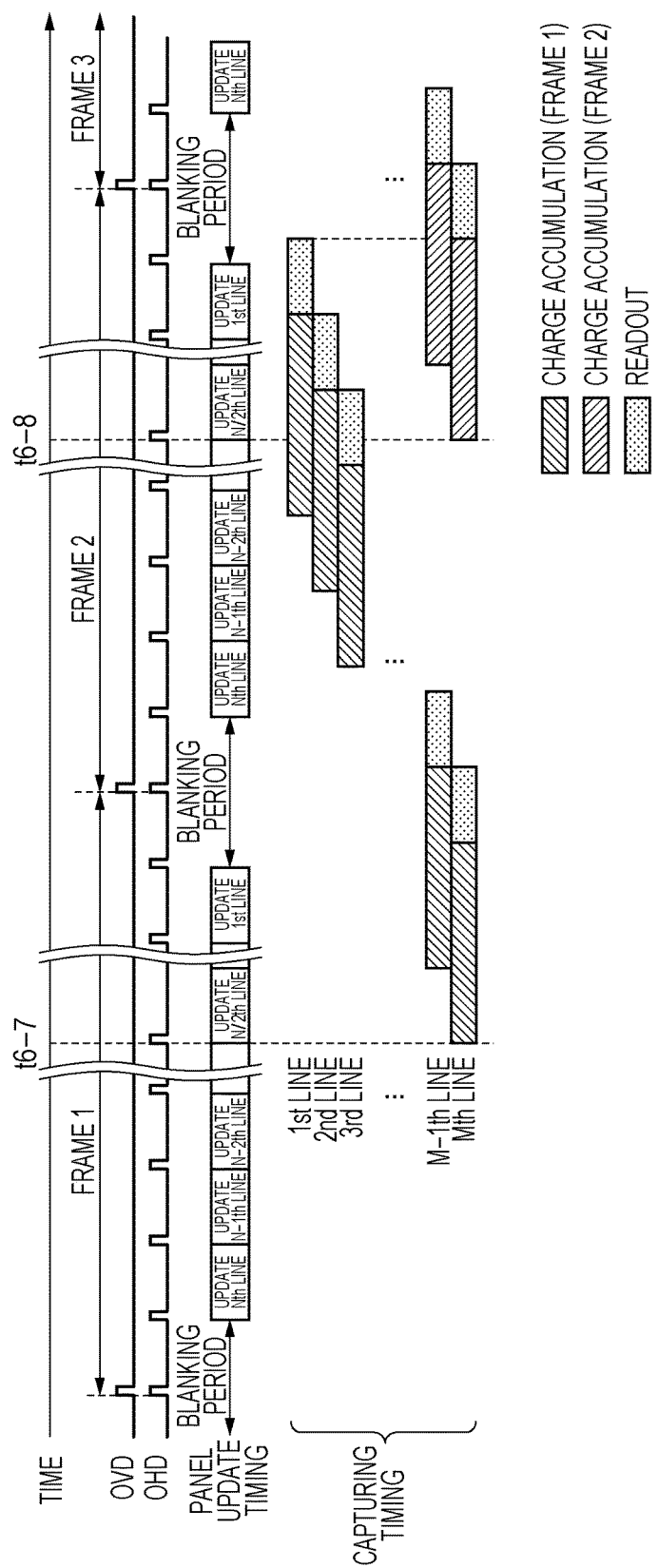
FIG. 7 is a timing diagram illustrating exemplary timings of charge accumulation and readout of the image capturing sensor in the first embodiment.

FIG. 7 illustrates capturing timing in a case where update timing of the liquid crystal panel 151 is the timing illustrated in FIG. 5B.

FIG. 6A illustrates exemplary timings of charge reset and readout in the image capturing sensor 182 in the first embodiment. The image capturing timing controller 184 counts the number of pulses of the OHD, recognizes timing at which update of the Nth line of the liquid crystal panel 151 is terminated (t6-1), and instructs to the image capturing sensor 182 to start charge reset and charge accumulation of the 1st line. After a predetermined charge accumulation period elapses, the image capturing timing controller 184 instructs to the image capturing sensor 182 to read the 1st line. Similarly, the image capturing timing controller 184 instructs to the image capturing sensor 182 to perform charge reset and start charge accumulation and readout from the 2nd to the Mth line sequentially.

As a characteristic operation in the first embodiment, charge accumulation of the Mth line is terminated before the time when the update of the 1st line of the frame 2 of the liquid crystal panel 151 is started (t6-2). The image capturing timing controller 184 determines that charge accumulation time of each line satisfies a condition expressed by the Expression below based on a length of a blanking period of the update timing of the liquid crystal panel 151 (t6-1 to t6-2).

Update Blanking Period of Liquid Crystal Panel 151)
≥(charge accumulation time of 1 line of image capturing sensor 182)
+(reading time of 1 line of image capturing sensor 182)×(M−1)

In order to obtain a stable captured image with especially few noise, it is desirable to lengthen the charge accumulation time of 1 line as much as possible in the range of the Expression above.

Since the blanking period is uniquely determined from the frame rate of the projected image, charge accumulation time and reading time of the image capturing sensor 182 may be determined based on the frame rate of the projected image.

A shift in charge accumulation start time of each line (tR) is desirably equal to the reading period of 1 line. In the image capturing sensor 182 employing a rolling shutter system, in order to prevent variation in brightness of a captured image, it is necessary to keep the charge accumulation time of each line the same. The charge accumulation time can be lengthened as much as possible while keeping the charge accumulation time of each line the same by starting charge accumulation of the subsequent line with a delay from the start of charge accumulation of the previous horizontal line by the time required for reading the line. The same applies to the timings of charge accumulation and readout of the image capturing sensor 182 illustrated in FIGS. 6B and 7 described below.

FIG. 6B illustrates other exemplary timings of charge accumulation and readout of the image capturing sensor 182 in the first embodiment. The timings illustrated in FIG. 6B differ from those illustrated in FIG. 6A mainly in that the image capturing timing controller 184 starts charge accumulation of the 1st line in synchronization with the OHD (t6-4, in this example) during an update period of the liquid crystal panel 151 (t6-3 to t6-5). Setting the timing of starting charge accumulation for capturing the frame 1 in this manner has an advantage that the periods for charge accumulation and readout can be prolonged as compared with the method in which charge accumulation is started after the update of Nth line of the liquid crystal panel 151 is terminated as illustrated in FIG. 6A.

In the example illustrated in FIG. 6B, charge accumulation of the 1st line of the image capturing sensor 182 is started at timing at which up to N/2−1st line of the liquid crystal panel 151 has been updated. The time t6-4 is not limited to that described above as long as it is the timing at which update of the projected image formed on the image capturing sensor 182 is terminated during the charge accumulation time of each line of the image capturing sensor 182 in a certain frame of the projected image.

FIG. 7 illustrates other exemplary timings of charge accumulation and readout of the image capturing sensor 182 of the first embodiment. As described above, when the image is projected in a vertically inverted manner, the liquid crystal projector 100 in the first embodiment sequentially updates the liquid crystal panel 151 from the Nth line to the 1st line. In a case where the liquid crystal panel 151 is thus updated, if charge accumulation of the image capturing sensor is performed sequentially from the 1st line as illustrated in FIG. 6B, an image in which the image of the previous frame and the image of the current frame are mixed will be captured. Then, when received a notification from the CPU 110 that the image is being projected in a vertically inverted manner, the image capturing timing controller 184 controls the image capturing sensor 182 to perform charge accumulation and readout sequentially from the Mth line to the 1st line in the reverse order of FIG. 6B.

By causing each part of the image capturing unit 180 to operate in the manner described above, when a projected image which changes for each frame is to be captured, it is possible to capture an image of a single frame without capturing an image in which images of plural frames are mixed.

The image capturing unit 180 does not necessarily have to capture the projected image for each frame. For example, only a projected image of a frame in which a calibration pattern is superimposed by the synthesizing unit 148 may be captured. Alternatively, only when a projected image different for each frame, or a projected image in which a calibration pattern different for each frame is superimposed is to be captured, the projected image may be captured at the capturing timing described above.

Figure 8:
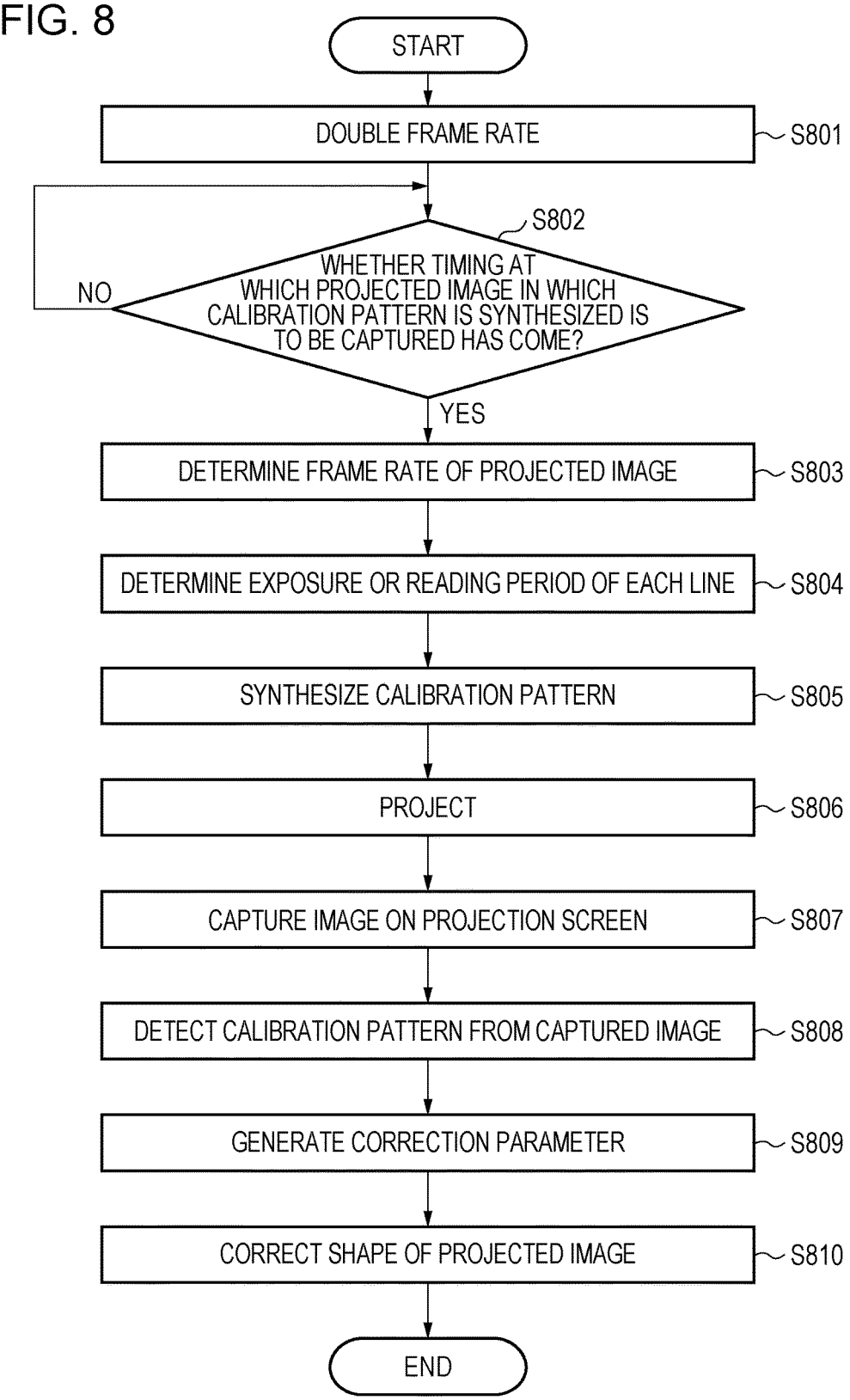
FIG. 8 is a flowchart illustrating an operation of a liquid crystal projector in the first embodiment.

Next, a sequence of capturing an image projected with a calibration pattern being superimposed in the liquid crystal projector 100 in the first embodiment, detecting a shape of the calibration pattern from the captured image, and correcting the shape of the projected image will be described with reference to FIG. 8.

In S801, the memory control unit 142 doubles the frame rate of the input image in the following procedure. First, the memory control unit 142 writes an image received in synchronization with the IVD in the image memory 143. Then, the memory control unit 142 reads the image from the image memory 143 in synchronization with the OVD at a rate twice the rate at which the image was written or using a data bus width twice as wide as that used in writing the image. The frame rate is doubled when the memory control unit 142 operates in the manner as described above. The output synchronizing signal generation unit 145 generates a frame identification signal representing that the frame rate has been doubled at a leading end side of the frame of the image of which frame rate has been doubled, and transmits the signal to the post-processing unit 144.

In S802, the CPU 110 determines whether the timing at which the projected image in which the calibration pattern is synthesized is to be captured has come. This timing may be every several seconds (a predetermined time interval) or may be timing at which vibration or movement of the projection apparatus is detected with an unillustrated acceleration sensor. Alternatively, it may be timing at which an instruction of a user of the liquid crystal projector 100 is received via an operation unit 113. If the CPU 110 determines that it has become the timing at which the calibration pattern is to be synthesized in the projected image, the routine proceeds to S803.

In S803, the CPU 110 determines the frame rate of the projected image. Specifically, it is only necessary to detect a generation timing period of the pulse of the OVD of the output synchronizing signal generation unit 145. The CPU 110 notifies the determination result of the frame rate to the image capturing timing controller 184. In S804, the image capturing timing controller 184 determines time of either or both of charge accumulation and readout of each line of the image capturing sensor 182 from the notified frame rate.

In S805, the synthesizing unit 148 synthesizes the calibration pattern with respect to the image input thereto. Here, as described above, the calculation pattern is synthesized by subtracting the calibration pattern in a certain frame as illustrated in FIG. 4B and by adding the calibration pattern in a subsequent frame as illustrated in FIG. 4C. In S806, an image in which the calibration pattern is synthesized by the synthesizing unit 148 is formed on the liquid crystal panel 151 by the image correction unit 149 and the liquid crystal control unit 150, and is projected through the projection optical system 171.

In S807, the image capturing unit 180 captures the image projected in S806 in synchronization with the output synchronizing signal in the manner as described above. In this example, two images are captured continuously in order to capture the projected images of FIGS. 4B and 4C. Then, the image capturing unit 180 transmits the captured image to the CPU 110.

In S808, the CPU 110 detects the calibration pattern from the captured image. If an image in which the calibration pattern is subtracted from the image with the thus-doubled frame rate (a subtraction image) as illustrated in FIG. 4B an image in which the calibration pattern is added to the image with the thus-doubled frame rate (an addition image) as illustrated in FIG. 4C are captured, only the calibration pattern illustrated in FIG. 4A can be extracted by obtaining a difference between the two images.
Calibration pattern=(captured image of FIG. 4C)−(captured image of FIG. 4B)

In S809, the CPU 110 generates correction parameters for an image shape and a projecting position by the memory control unit 142 based on extracted pattern information. As an example, a method for generating a projective transformation parameter necessary for correcting the projected image from coordinates of four vertices of the shape of the detected calibration pattern is proposed. The method for generating the correction parameter is not limited to that described above; any methods may be employed including publicly known techniques.

In S810, the memory control unit 142 issues an access address to the image memory 143 based on the correction parameter generated in S809 and changes the shape of the image.

By causing each part of the liquid crystal projector 100 to operate in the manner as described above, if the projected image with calibration patterns different for each frame being superimposed is to be captured, an image of a single frame can be captured without capturing an image into which an image of a frame before or after update is mixed. Therefore, the calibration pattern can be detected appropriately and the position or the shape of the projected image can be corrected appropriately.

Although the image capturing unit 180 is included inside the liquid crystal projector 100 in the first embodiment, the present disclosure is not limited to this configuration. The present disclosure may be a system constituted by a digital camera including the image capturing unit 180, and a liquid crystal projector. In this case, the operation described above can be performed by transmitting the output synchronizing signals OVD and OHD to the digital camera by a wired or wireless communication unit from the liquid crystal projector.

Second Embodiment

Figure 9:
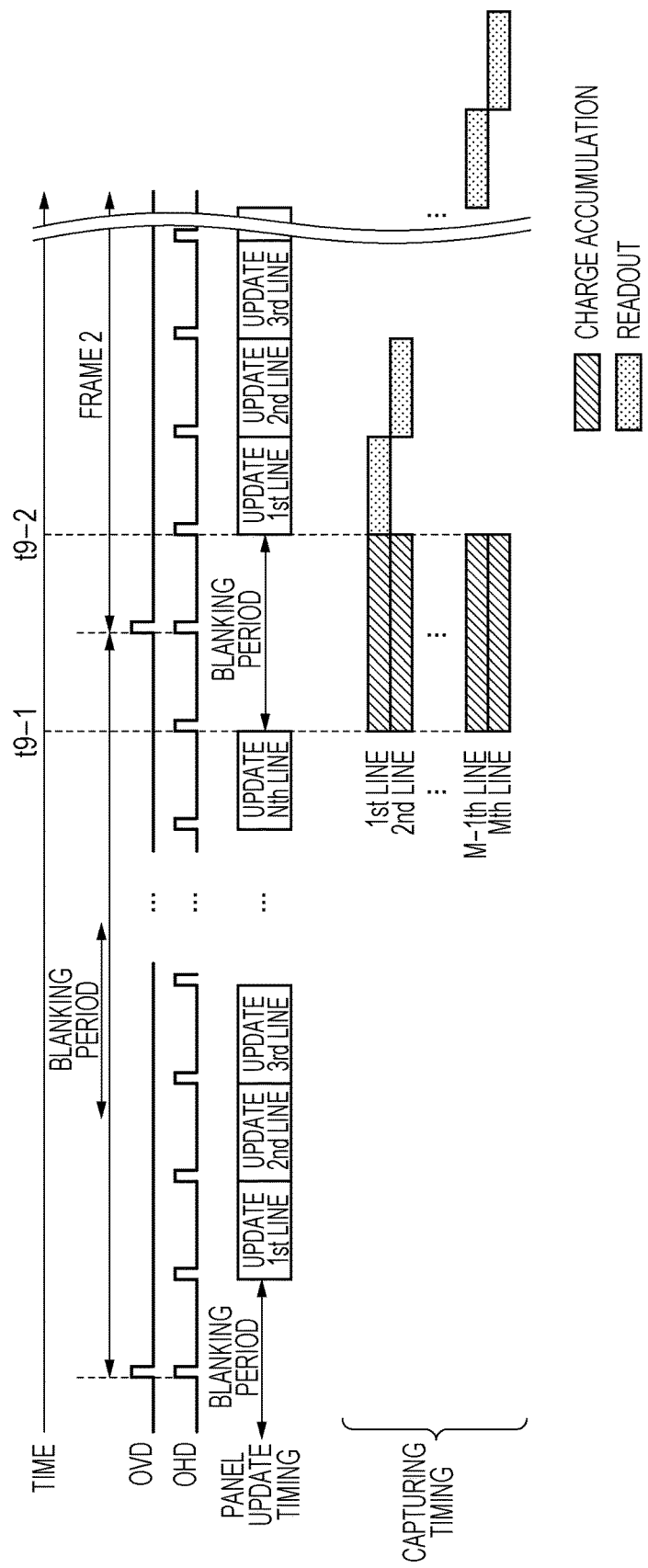
FIG. 9 is a timing diagram illustrating exemplary timings of charge accumulation and readout of an image capturing sensor in a second embodiment.

Next, a second embodiment of the present disclosure will be described. In the second embodiment, another exemplary timing at which the image capturing unit 180 captures a projected image will be described with reference to FIG. 9. Since a configuration of the liquid crystal projector 100 in the second embodiment is the same as that described in the first embodiment, description will be omitted.

The present embodiment differs from the first embodiment in that the image capturing sensor 182 in the second embodiment employs a global shutter system in which charge accumulation of all the lines is performed simultaneously. The number of lines of the image capturing sensor 182 here is M lines (M is an integer).

The image capturing timing controller 184 counts the number of pulses of the OHD and recognizes timing at which update of the Nth line of the frame 1 of the liquid crystal panel 151 is terminated (t9-1), and starts charge reset and charge accumulation of all the lines of the image capturing sensor 182. The image capturing timing controller 184 terminates charge accumulation before the time when update of the 1st line of the frame 2 of the liquid crystal panel 151 is started (t9-2), and then performs readout.

The charge accumulation time and the reading time of the image capturing sensor 182 in the second embodiment are not limited to those described above, and may be
(Blanking Period of Liquid Crystal Panel 151)
≥(charge accumulation time of each line of image capturing sensor 182) and
(Update Period of Liquid Crystal Panel 151)
≥(reading time of each line of image capturing sensor 182)×M.

As described above, according to the second embodiment, when a projected image which changes for each frame is to be captured, it is possible to capture an image of a single frame without capturing an image in which images of plural frames are mixed.

Third Embodiment

Next, a third embodiment of the present disclosure will be described with reference to FIGS. 10A, 10B and 11. The third embodiment differs from the first embodiment in that plural (four, in this example) image processing units 140 and plural (four, in this example) liquid crystal control units 150 exist. Since other configurations of the liquid crystal projector 100 are the same as in the first embodiment, description will be omitted.

Figure 10A:
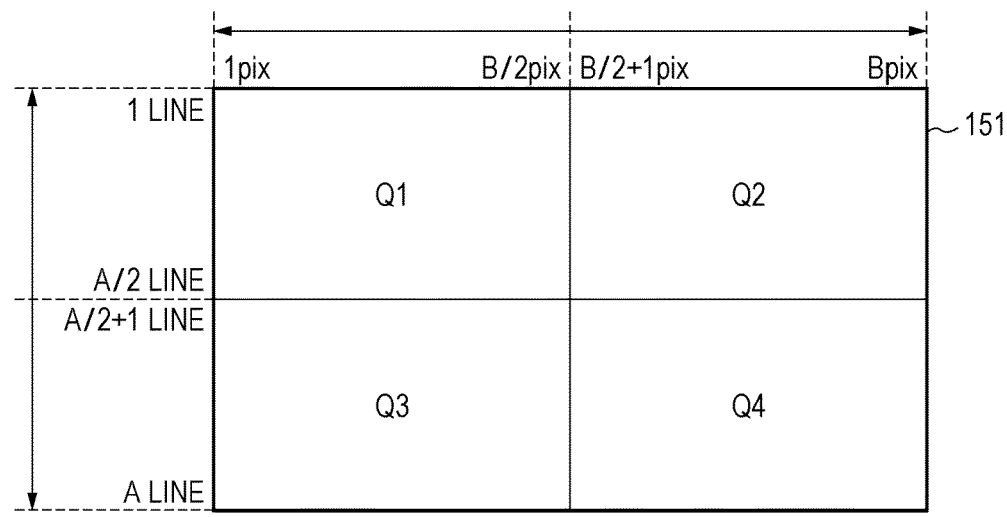
FIGS. 10A and 10B are diagrams for describing a relationship between an image processing unit and a liquid crystal control unit, and an area of a liquid crystal panel in a third embodiment.
Figure 10B:
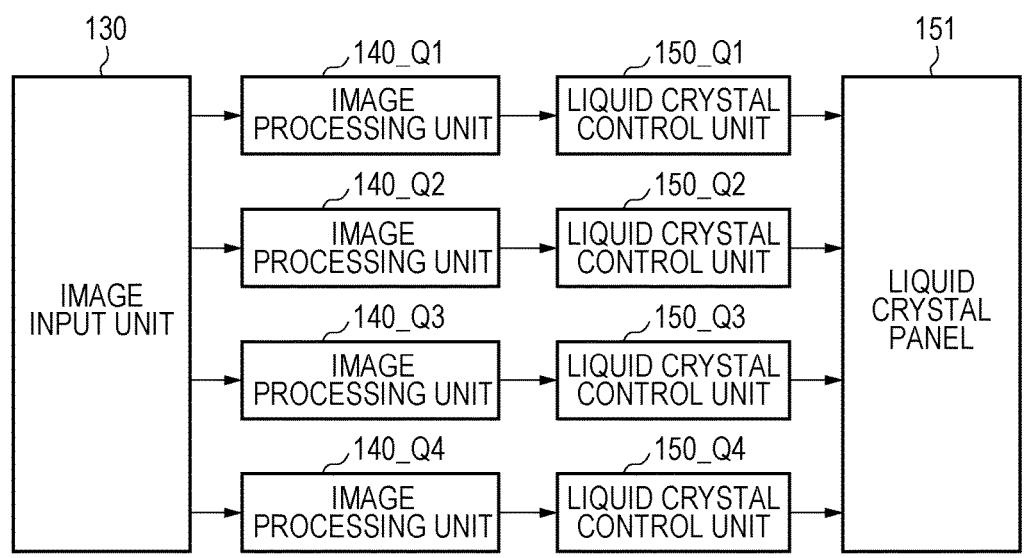
Figure 11:
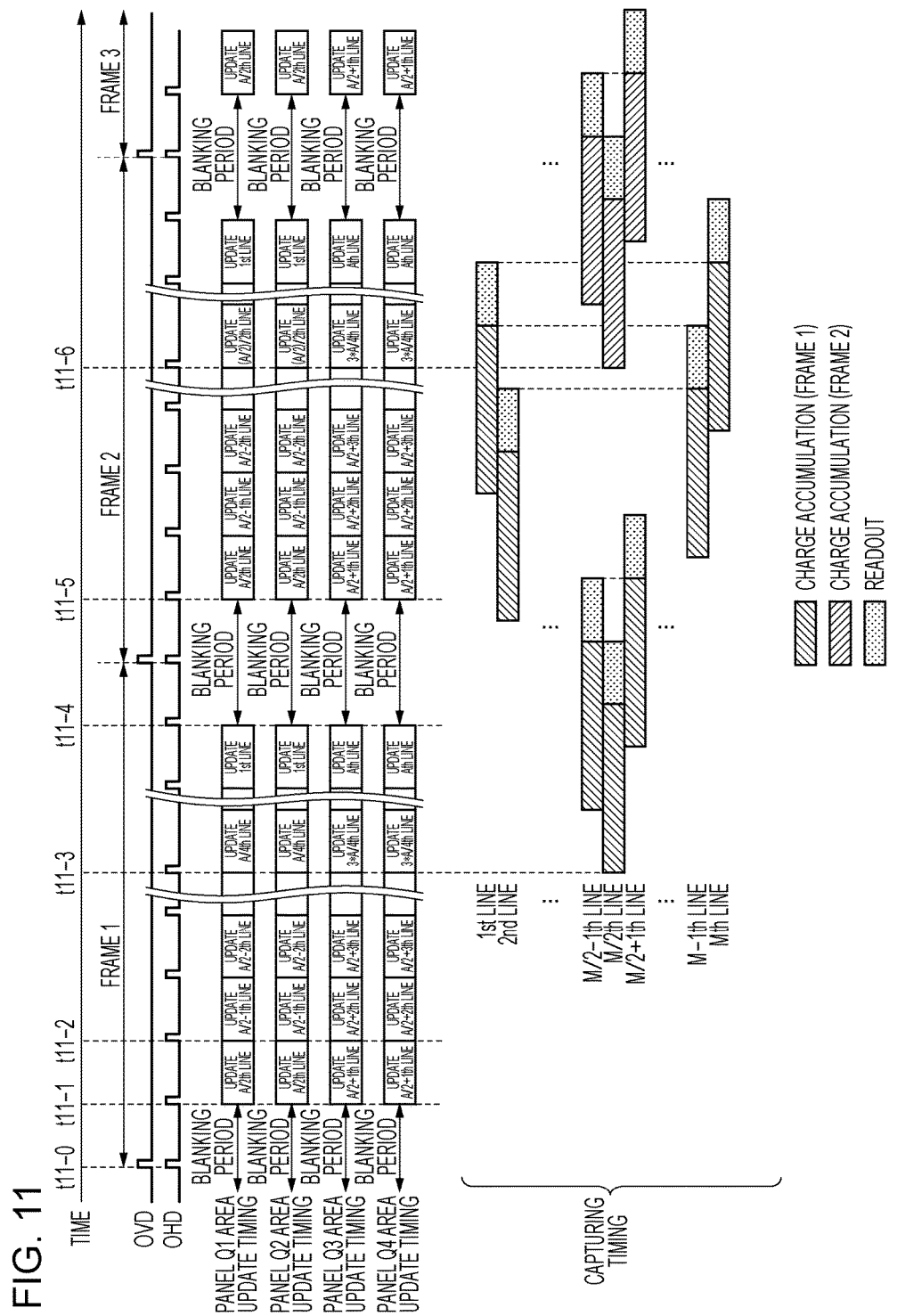
FIG. 11 illustrates exemplary update timing of the liquid crystal panel, and exemplary timings of charge accumulation and readout of an image capturing sensor in the third embodiment.

FIG. 10A illustrates a concept of divided areas Q1 to Q4 of the liquid crystal panel 151 in the third embodiment. FIG. 10B illustrates image processing units 140_Q1 to 140_Q4 and liquid crystal control units 150_Q1 to 150_Q4 corresponding to the divided areas Q1 to Q4. In the third embodiment, the liquid crystal panel 151 has the number of horizontal pixels Bpix and the number of vertical lines A lines (A and B are integers), divided into two horizontally and vertically, respectively, to have four divided areas (Q1 to Q4).

The image input unit 130 divides the input image into four and transmits the divided images to the image processing units 140_Q1 to 140_Q4. Internal configurations of the image processing units 140_Q1 to 140_Q4 and the liquid crystal control units 150_Q1 to 150_Q4 are the same as those of the image processing unit 140 and the liquid crystal control unit 150, respectively, described in the first embodiment. The liquid crystal panel 151 receives an image, a control signal, etc., corresponding to each of the divided areas Q1 to Q4 from the liquid crystal control units 150_Q1 to 150_Q4, simultaneously, and updates.

Parallelizing the processing in this configuration is especially effective in a case where resolution of the image increases and throughput per predetermined time increases.

The image capturing sensor 182 in the third embodiment employs a rolling shutter method which sequentially performs readout for each line. The number of lines of the image capturing sensor 182 here is M lines (M is an integer).

Update Order of Lines of Division Driving Panel

An update order of each line of the liquid crystal panel 151 in the third embodiment will be described with reference to FIG. 11.

First, the panel timing controller 153 which controls update timing of the liquid crystal panel 151 detects a rise of the OVD at t11-0, and recognizes the start of drawing processing of an image of a frame 1.

Next, the panel timing controller 153 of each of the liquid crystal control units 150_Q1 to 150_Q4 counts the OHD a predetermined number of times (twice, in this example). The panel timing controller 153 then applies a scanning voltage to a scanning electrode of the following lines of the liquid crystal panel 151 at a rise of the OHD of a predetermined number of times (t11-1):

Q1: A/2th line
Q2: A/2th line
Q3: A/2+1th line
Q4: A/2+1th line

In this condition, update of each pixel of the first two lines is performed in accordance with an analog signal from the DAC 152 input in the pixel electrode of each of the divided areas Q1 to Q4 of the liquid crystal panel 151.

Next, at a next rise (t11-2) of the OHD, the panel timing controller 153 terminates application of the scanning voltage to the first two lines of the liquid crystal panel 151, whereby update of the A/2th line and A/2+1th line of the liquid crystal panel 151 is terminated. At t11-2, the panel timing controller 153 applies the scanning voltage to subsequent two lines of the liquid crystal panel 151 given below to start update of pixels for following two lines, and terminates application of the scanning voltage at the next rise of the OHD and terminates update.

Q1: A/2−1th line
Q2: A/2−1th line
Q3: A/2+2th line
Q4: A/2+2th line

As described above, the panel timing controllers 153 of the liquid crystal control units 150_Q1 and 150_Q2 update the liquid crystal panel 151 in an ascending order from the A/2th line to the 1st line in the procedure described above. Similarly, the panel timing controllers 153 of the liquid crystal control units 150_Q3 and 150_Q4 update the liquid crystal panel 151 in a descending order from the A/2+1th line to the Ath line in the procedure described above.

By operating the panel timing controller 153 in the manner described above, an image of the frame 1 is drawn in all the pixels at t11-4.

Next, the panel timing controller 153 recognizes that drawing processing of an image of the frame 2 has been instructed by detecting a rise of the OVD. From the second rise (t11-5) of the OHD in the frame 2, the panel timing controller 153 updates from the central line to upper and lower directions of the liquid crystal panel 151 in the same manner as in the drawing processing of the frame 1.

By updating the liquid crystal panel 151 in this manner, since the lines on the boundaries of the areas are updated simultaneously, there is an advantage that display misalignment is not viewed.

Capturing Timing of Projector Using Division Driving Panel

Next, timings of charge accumulation and readout of the image capturing sensor 182 in the third embodiment will be described with reference to FIG. 11.

Charge accumulation of the image capturing sensor 182 may be performed during a blanking period as illustrated in FIG. 6A of the first embodiment. Here, however, a case where charge accumulation of the image capturing sensor 182 is started at timing at which charge accumulation is started during the update period of the liquid crystal panel 151 as described with reference to FIG. 6B will be described. That is, the image capturing timing controller 184 starts charge accumulation of the 1st line of the image capturing sensor 182 in synchronization with the OHD (t11-3, in this example) during the update period of the liquid crystal panel 151 (t11-1 to t11-4).

A difference from the timing illustrated in FIG. 6B of the first embodiment is that the line for which charge accumulation and readout are performed first is the M/2th line, which is the central line of the image capturing sensor 182. The charge accumulation and the readout are sequentially performed from the central line toward a peripheral line (e.g., M/2−1th line, M/2+1th line, ... ). By setting the order of update of each line of the liquid crystal panel 151 and the order of lines of charge accumulation and readout of the image capturing sensor 182 to be similar to each other, charge accumulation time and reading time can be prolonged compared with other orders of charge accumulation and readout.

The charge accumulation start time t11-4 is not limited to that described above as long as it is timing at which update of the projected image formed on the image capturing sensor 182 is terminated during the charge accumulation period of each line of the image capturing sensor 182.

Although exemplary timings of charge accumulation and readout of the image capturing sensor 182 in a case where the areas of the liquid crystal panel 151 are simultaneously updated have been described, the present disclosure is not limited to this example. For example, the present disclosure is applicable to a configuration in which the divided areas Q1 to Q4 of the liquid crystal panel 151 are sequentially updated from an upper line to the lower line in synchronization with one another. Also in this case, the image capturing timing controller 184 determines the order of charge accumulation and readout of the image capturing sensor 182 in consideration of the order of update of each line of the liquid crystal panel 151. For example, the order of charge accumulation and readout may be 1st line, M/2th line, 2nd line, and M/2+1th line.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-223340, filed Nov. 13, 2015, which is hereby incorporated by reference herein in its entirety.

What is claimed is:

1. A projection apparatus comprising:
a processor; and
a memory having stored thereon instructions that when executed by the processor, cause the processor to:
output an image signal in which a predetermined calibration pattern is synthesized in an input image;
control transmittance or reflectance of a display unit and form an image based on the output image signal;
project an image formed on the display unit by irradiating the display unit with light;
capture the projected image by an image sensor which employs a rolling shutter system in which charge accumulation is performed for each row;
extract the calibration pattern from the captured image and generate a correction parameter for correcting an image to be formed on the display unit depending on a condition of the extracted calibration pattern; and
control image capturing timing so that images before and after update of the display unit is not mixed in the captured image,
wherein controlling the image capturing timing is executed by
recognizing update timing of a predetermined line of the display unit on a basis of a synchronizing signal, and by
starting charge accumulation for a predetermined row of the image sensor during an update period of the display unit.

2. The projection apparatus according to claim 1, wherein the instructions further cause the processor to divide the display unit into plural areas and control transmittance or reflectance of the plural areas in parallel.

3. The projection apparatus according to claim 1, wherein the instructions further cause the processor to output an image signal of an addition image synthesized by adding the calibration pattern to the input image and an image signal of a subtraction image synthesized by subtracting the calibration pattern is from the input image, and extract the calibration pattern by subtracting the image obtained by capturing the projected subtraction image from the image obtained by capturing the projected addition image.

4. The projection apparatus according to claim 1, wherein the instructions further cause the processor to synthesize plural different calibration patterns to correspond to each of images.

5. The projection apparatus according to claim 1, wherein if vibration of the projected image is detected or if movement or vibration of the projection apparatus is detected, the instructions further cause the processor to capture an image in which the calibration pattern is synthesized.

6. The projection apparatus according to claim 1, wherein the instructions further cause the processor to perform the synthesis at predetermined time intervals.

7. The projection apparatus according to claim 1, wherein the image capturing timing is controlled so that a shift in charge accumulation start time of each row is substantively equal to a reading period of one row.

8. The projection apparatus according to claim 1, wherein the predetermined row is a first row or a last row of the image sensor.

9. A projection system including a projection apparatus and an image capturing apparatus, wherein
the projection apparatus comprises:
a processor; and
a memory having stored thereon instructions that when executed by the processor, cause the processor to:
output an image signal in which a predetermined calibration pattern is synthesized in an input image;
control transmittance or reflectance of a display unit and form an image based on the output image signal;
project an image formed on the display unit by irradiating the display unit with light; and
generate a correction parameter for correcting an image formed on the display unit, and
the image capturing apparatus comprises:
a processor; and
a memory having stored thereon instructions that when executed by the processor, cause the processor to:
capture the projected image by an image sensor which employs a rolling shutter system in which charge accumulation is performed for each row;
control image capturing timing so that images before and after update of the display unit is not mixed in the captured image, wherein controlling the image capturing timing is executed by
recognizing update timing of a predetermined line of the display unit on a basis of a synchronizing signal, and by
starting charge accumulation for a predetermined row of the image sensor during an update period of the display unit; and
extract the calibration pattern from the captured image and generate a correction parameter for correcting an image to be formed on the display unit depending on a condition of the extracted calibration pattern.

10. A method for controlling a projection apparatus, the method comprising:
a synthesizing step of outputting an image signal in which a predetermined calibration pattern is synthesized in an input image;
a formation step of forming an image while controlling transmittance or reflectance of a display unit based on the image signal output in the synthesizing step;
a projection step of projecting the image formed on the display unit by irradiating the display unit with light;
an image capturing step of capturing the image projected in the projection step by an image sensor which employs a rolling shutter system in which charge accumulation is performed for each row; and
a generation step of extracting the calibration pattern from the image captured in the image capturing step and generating a correction parameter for correcting the image to be formed on the display unit depending on a condition of the extracted calibration pattern, wherein
in the image capturing step, image capturing timing is controlled so that images before and after update of the display unit is not mixed in the captured image,
wherein controlling the image capturing timing is executed by
recognizing update timing of a predetermined line of the display unit on a basis of a synchronizing signal, and by
starting charge accumulation for a predetermined row of the image sensor during an update period of the display unit.

* * * * *